(12) United States Patent
Ahrens

(10) Patent No.: US 9,083,791 B2
(45) Date of Patent: Jul. 14, 2015

(54) WEB-HOSTED FRAMEWORK FOR MOBILE APPLICATIONS

(75) Inventor: Matthew Ahrens, Champaign, IL (US)

(73) Assignee: Yahoo ! Inc., Sunnyvale, CA (US)

( * ) Notice: Subject to any disclaimer, the term of this patent is extended or adjusted under 35 U.S.C. 154(b) by 985 days.

(21) Appl. No.: 12/358,190

(22) Filed: Jan. 22, 2009

(65) Prior Publication Data

US 2010/0184422 A1    Jul. 22, 2010

(51) Int. Cl.
  *H04M 3/00*  (2006.01)
  *H04M 3/42*  (2006.01)
  *H04M 1/725*  (2006.01)
  *H04L 29/08*  (2006.01)

(52) U.S. Cl.
  CPC ........... *H04M 3/42178* (2013.01); *H04L 67/02* (2013.01); *H04L 67/34* (2013.01); *H04M 1/72525* (2013.01); *H04M 1/72561* (2013.01); *H04M 1/72563* (2013.01)

(58) Field of Classification Search
  USPC .......................................... 455/419; 709/223
  See application file for complete search history.

(56) References Cited

U.S. PATENT DOCUMENTS

| | | | |
|---|---|---|---|
| 2004/0003031 A1* | 1/2004 | Brown et al. ................. | 709/203 |
| 2005/0033693 A1* | 2/2005 | Toiminen ........................ | 705/43 |
| 2006/0079284 A1* | 4/2006 | Lu et al. ........................ | 455/558 |
| 2007/0088805 A1* | 4/2007 | Cyster ........................... | 709/217 |
| 2007/0209005 A1* | 9/2007 | Shaver et al. ................. | 715/733 |
| 2007/0282858 A1* | 12/2007 | Arner et al. .................... | 707/10 |
| 2008/0147671 A1* | 6/2008 | Simon et al. ................... | 707/10 |
| 2010/0162229 A1* | 6/2010 | Tsuk et al. .................... | 717/175 |
| 2010/0174789 A1* | 7/2010 | Pena et al. ..................... | 709/206 |

* cited by examiner

*Primary Examiner* — Christopher M Brandt
*Assistant Examiner* — Joseph Dean, Jr.
(74) *Attorney, Agent, or Firm* — James J. DeCarlo; Greenberg Traurig, LLP

(57) ABSTRACT

Embodiments are directed towards providing a web-based framework for access and use of mobile device applications within an application stack. The mobile device includes a mobile web framework application (MWFA) that, when the mobile device boots up, seeks to connect online to a remote web-based interface manager. The remote interface manager provides a display of an application user interface to the mobile device, from which a user may access various applications that may be configured to execute at a remote device rather than on the mobile device. The user may also add to or otherwise modify the applications within the application stack.

18 Claims, 8 Drawing Sheets

WEB-HOSTED FRAMEWORK FOR MOBILE APPLICATIONS

TECHNICAL FIELD

Embodiments relate generally to managing configurations of a mobile client device over a network and, more particularly, but not exclusively to enabling users of mobile client devices to access mobile applications over a network rather than having their mobile client device be pre-configured with mobile applications, thereby increasing flexibility, and providing update management of a mobile client device's configuration.

BACKGROUND

Tremendous changes have been occurring in the Internet that influence our everyday lives. For example, in today's society, mobile computing devices are becoming increasingly more common. Many mobile computing devices, such as personal digital assistants, cellular phones, and the like, may be employed to communicate voice messages, emails, text messages, and so forth, as well as to search for information over the Internet. It is not uncommon to see a person on a bus, train, or even a boat, to be using their mobile devices to perform searches over the Internet, check their calendars, listen to music, play games, text messages, and yes, even conduct voice communications with their mobile devices.

Many consumers actually enjoy selecting the color, shape, and functionality of their mobile devices for purchase. However, once the consumer leaves the merchant store with, or otherwise receives, their newly purchased mobile device, they are often restricted by the mobile device manufacturer as to what, if anything, may be changed on their mobile device. While some mobile device manufacturers may allow limited changes to a mobile device, such as installing ringtones, downloading photographs, movies, or other entertainment content, often it is the case that the consumer must purchase a different physical mobile device to obtain different functionality. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
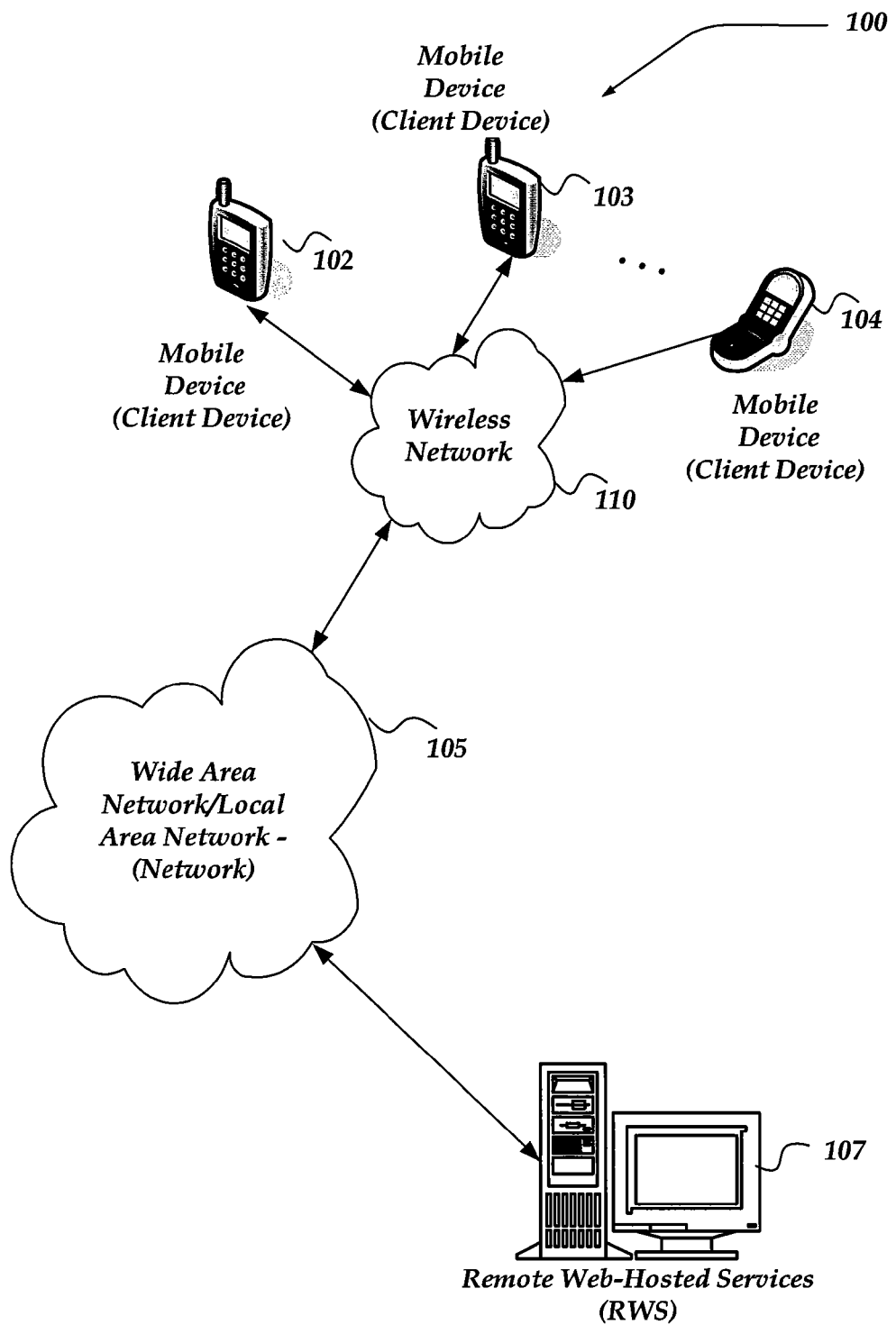
FIG. 1 is a system diagram of one embodiment of an environment in which various embodiments may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the phrase "application stack" refers to a collection of applications and/or services that are configured to reside and operate on a mobile device, such as a mobile phone. Any of a variety of layered models may be employed to distinguish components within a mobile device. Thus, in one embodiment, one layered system model may include kernel services, and hardware interface services layer; operating services layer; base services layer; and application services layer. The base services layer may be considered to include those lowest level reachable components by a user-side operation. The application services layer, which in this example, represents the application stack, includes such applications, and data for components such as telephony management and interfaces, web management and interface, contacts manager and interface, games, media players, call history manager, music manager, picture manager, camera manager, recording manager, setting manager, tools manager, and the like. As may be seen from this example, the application stack then is above and excludes operating services.

As used herein, the phrases "minimum set of applications" or "MSA" refer to a selectable subset of applications in the application stack that a user may employ during a network disconnect (or offline configuration). Such minimum set of applications are those applications that at least some functionality may be provided onto the mobile device, such that when the mobile device is determined to be offline, the at least some functionality may be made available to the mobile device user. As described in more detail below, some applications may be identified as being unavailable when the mobile device is determined to be offline, while other applications (those identified within the minimum set of applications) may be available for at least a limited function. For example, a calendar application might be identified as one application available in the minimum set of applications. Therefore, at least some interfaces, portions of the application, portions of the application data, and the like, for the calendar application may be downloaded to the mobile device. When the mobile device is determined to be online, and perhaps, in a background mode, the minimum set of applications might be updated, or otherwise maintained on the mobile device. Moreover, during such online configurations, full functionality for the application may be available through the web-hosted application access. When the mobile device is determined to be offline, the application subset, and/or subset functionality of an application may be accessible by the mobile device user, while other functions of the application might be made unavailable. With respect to the example, calendar, reading of a calendar set of activities might be made available offline, while some functionality of the calendar, such as viewing another user's calendar, might be made unavailable in the offline mode. It should be noted, that other applications might be included within a minimum set of applications, including, but not limited to a contact list application, or the like.

As used herein, the phrases "online configuration" or "online" refer to a series of networking interactions between two or more communication end points over a network that occur within a network connection. Several sessions can use the same network connection, and sessions may span multiple individual connections in parallel or in series. The phrases "offline configuration" or "offline" therefore refer to where there is currently an absence of networking interactions between two or more communication end points over a network that occur within a network connection, where the communication end points are capable of communicating when otherwise online. As used herein a "network connection" is a collection of links and/or software elements that enable a computing device to communicate with another computing device over a network.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards providing a web-based framework for access and use of mobile device applications within an application stack. The mobile device may include a mobile web framework application (MWFA) that, when the mobile device, boots up, seeks to connect online to a remote web-based interface manager.

The remote interface manager enables a display of an application user interface to the mobile device, from which a user may then select and execute various applications. Each of the selected application may be configured to execute remotely, rather than on the mobile device. Thus, the mobile device need not be configured to install the application. In one embodiment, however, the mobile device may be configured to download a minimum set of applications, minimum application interface data set, or the like, such that should the mobile device detect that it is offline, the user may still have access to a subset of applications and/or subset of functionality of at least one application from a selectable application stack.

Thus, in one embodiment, the user may select to store some user data remotely and/or locally on the mobile device. The user may further select to have downloaded a subset of applications from the user selectable application stack and/or download data useable by one or more of the subset of applications. Such downloaded applications, and/or subset of applications, data, or the like, may then be available during offline activities.

In still another embodiment, the user may modify the set of applications in an application stack, by installing updates and/or new applications into the application stack that is hosted on a remote network device. In this manner, for example, processing and/or memory capability, and/or operating system configuration, need not be a constraint to application use. Thus, the user may be provided with a flexible and convenient mechanism to modify and/or expand functionality accessible through their mobile device.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 102-104, and Remote Web-hosted Services (RWS) 107.

One embodiment of client devices 102-104 is described in more detail below in conjunction with FIG. 2. Generally, however, client devices 102-104 may include virtually any portable computing device capable of receiving and sending a message over a network, such as network 105, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network.

A web-enabled client device may include an application that is configured to receive and to send web pages, web-based messages, and the like. The application may be configured to receive and display graphics, text, multimedia, and the like, employing virtually any web-based language, including a wireless application protocol messages (WAP), and the like. In one embodiment, the application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), and the like, to display and send a message. In one embodiment, a user of the client device may employ the application to access a web-hosted set of applications within an application stack over a network. In one embodiment, the application might be pre-loaded onto client devices at time of manufacture, time of purchase, or the like. One embodiment of such an application is described in more detail below in conjunction with FIG. 2.

Client devices 102-104 also may include at least one component that is configured to receive content from another computing device. The component may further provide information that identifies itself, including a type, capability, name, and the like. In one embodiment, client devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent to RWS 107, or other computing devices.

Wireless network 110 is configured to couple client devices 102-104 and its components with network 105. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 105 is configured to couple network devices with other computing devices, including, RWS 107, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of RWS 107 is described in more detail below in conjunction with FIG. 3. Briefly, however, RWS 107 may include any computing device capable of connecting to network 105 to enable client devices 102-104 to access and employ one or more web-hosted applications from an application stack over one or more networks as described further below. RWS 107 enables a user of one or more client devices 102-104 to configure which applications to access over the network, where at least some data may be stored, whether an application and/or portion of an application may be accessible during an offline configuration, as well as a variety of other actions directed towards managing use of web-hosted applications.

Devices that may operate as RWS 107 include various network devices, including, but not limited to personal computers, desktop computers, multiprocessor systems, microprocessor-based or programmable consumer electronics, network PCs, servers, network appliances, and the like.

Illustrative Client Device

Figure 2:
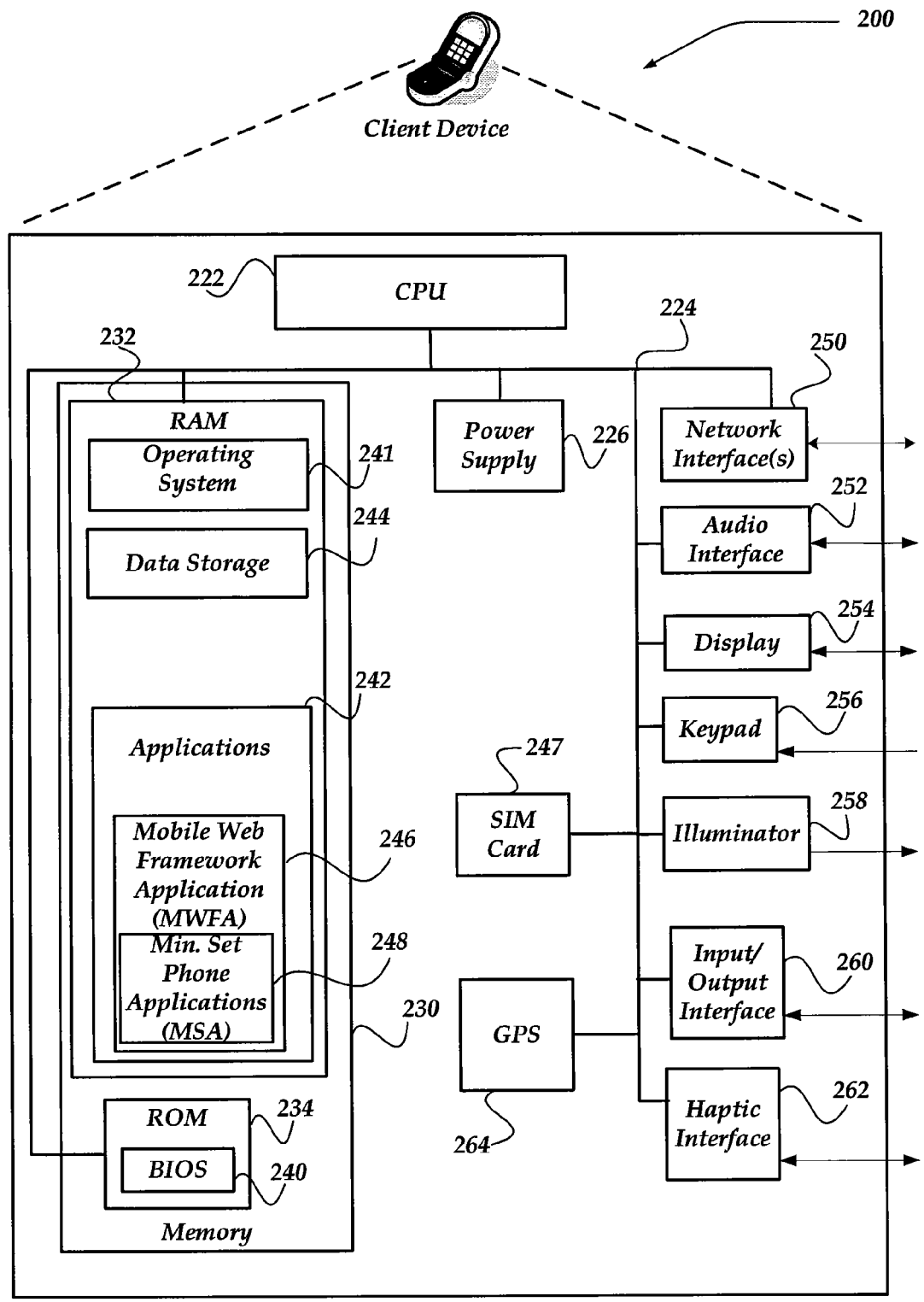
FIG. 2 shows one embodiment of a client device that may be included in a system implementing various embodiments.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store data that the user might specify for local storage, and/or an application determines that at least some of the data is to be stored locally, at least during an offline configuration. At least a portion of the information may also be stored on a disk drive or other storage medium (not shown) within client device 200.

Applications 242 include at least one application, Mobile Web Framework Application (MWFA) 246, which is configured to enable access over a network to a remote network device that provides web-hosted applications. Thus, MWFA 246 may be configured to receive and display graphics, text, multimedia, and the like, employing virtually any web based language. In one embodiment, the MWFA 246 is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed.

MWFA 246 may be installed during manufacture and/or at time of purchase of client device 200. In one embodiment, MWFA 246 may be downloaded over a network for installation. In one embodiment, MWFA 246 is configured to access SIM card 247, which may be configured to store and/or otherwise manage information about the client device, including, but not limited to a network address, phone number, or other identifier of the client device. SIM card 247 may also include information about how to access a remote network device for access to web-hosted applications. Such information may include, but is not limited to a network address, URL, phone number, or the like.

MWFA 246 may also be configured to enable a user and/or a remote application to identify one or more applications to download at least a portion of the application for use during an offline use. Thus, in one embodiment, one or more applications may be at least in part, be downloaded onto client device 200 to create a minimum set of (phone) applications (MSA) 248, locally. Such applications might include applications that at least a portion of the application may be executed without access to the remote web-hosted application portion. For example, a calculator, at least a portion of a calendar, to do list application, a contact list application, or the like, might represent non-limiting, non-exhaustive examples of possible applications or portions thereof that may be included in MSA 248.

Illustrative Network Device

Figure 3:
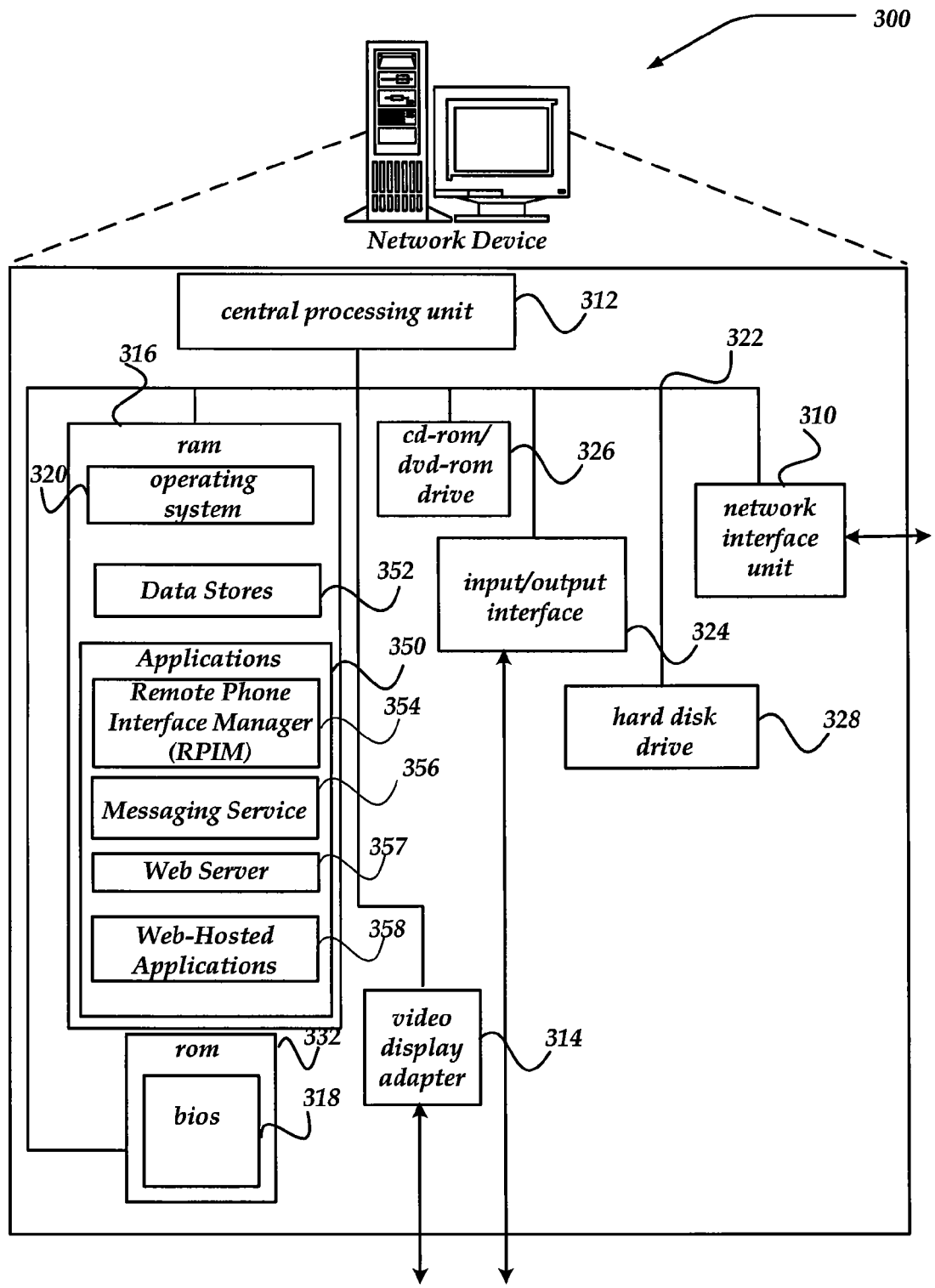
FIG. 3 shows one embodiment of a network device that may be included in a system implementing various embodiment.

FIG. 3 shows one embodiment of a network device 300, according to one embodiment of the invention. Network device 300 may include many more or less components than those shown. The components shown, however, are sufficient to disclose an illustrative embodiment for practicing various embodiments. Network device 300 may represent, for example, RWS 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer-readable storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

As shown, data stores 352 may include a database, text, spreadsheet, folder, file, or the like, that may be configured to maintain and store any of a variety of user application data, or the like, that may be associated with one or more web-hosted applications, accounts, or the like. In one embodiment, at least some of data store 352 might also be stored on another component of network device 300, including, but not limited to cd-rom/dvd-rom 326, hard disk drive 328, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Web server 357, messaging server 356, and Remote Phone Interface Manager (RPIM) 354 may also be included as application programs within applications 350.

Web server 357 represent any of a variety of services that are configured to provide content, including messages, over a network to another computing device. Thus, web server 357 includes for example, a web server, a File Transfer Protocol (FTP) server, a database server, a content server, or the like. Web server 357 may provide the content including messages over the network using any of a variety of formats, including, but not limited to WAP, HDML, WML, SMGL, HTML, XML, cHTML, xHTML, or the like. In one embodiment, web server 357 may enable a user to interact with and/or access one or more web-hosted application managed through RPIM 354.

Messaging server 356 may include virtually any computing component or components configured and arranged to forward messages from message user agents, and/or other message servers, or to deliver messages to a local message store, such as data store 354, or the like. Thus, messaging server 356 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging server 356 may also be managed by one or more components of messaging server 356. Thus, messaging server 356 may also be configured to manage SMS messages, IM, MMS, IRC, RSS feeds, mIRC, or any of a variety of other message types. In one embodiment, messaging server 356 may enable users to initiate and/or otherwise conduct chat sessions, VOIP sessions, or the like. In one embodiment, messaging server 356 may interact with RPIM 354 to enable a user to access and/or otherwise manage messages.

Web-hosted applications 358 represents any of a variety of applications that a mobile device user might want to employ over a network. Such applications, includes, but are not limited to web browser applications, drawing applications, messaging applications, picture applications, phone applications, call history applications, calculators, music applications, multimedia applications, or the like, to name just a very few examples. Moreover, because such applications may be hosted on network device 300 rather than on a mobile device, at least in part, updates to the applications may be performed transparent to a user. In addition, users may select one or more applications to be included in their application stack for use by their mobile device.

In one embodiment, web-hosted applications 358 may include interfaces, and/or portions of applications that may be downloadable onto a mobile device for use when the mobile device is offline. Such portions of applications might be configured to provide some functionality of a full application, while other functions of the application might be inaccessible. In one embodiment, when a user selects, or a configuration option is chosen, the portion of the application/interface may be downloaded onto the mobile device. In one embodiment, the downloading might occur at a particular point in time, and/or be performed in a background mode, such that the user may employ another application, function, or the like, while at least a portion of a different application is being downloaded. In one embodiment, the portion downloaded might include scripts, interfaces, or the like, that may be configured to be independent of an operating system on the mobile device. In another embodiment, before the application/interface is downloaded, an examination of the mobile device may be performed to determine a configuration of the mobile device, including its operating system, hardware configuration, capabilities, or the like. In one embodiment, such information may be obtained by querying the mobile device. For example, in one embodiment, MWFA 246 might query the client device and provide such information over the network. In another embodiment, another component of the client device might provide such information. In any event, in one embodiment, the application/interface may be selected to be compatible with the mobile device. In one embodiment, the downloaded application/interface may also be configured to store data local to the mobile device when the mobile device is offline, and to interact with MWFA 246, or to operate independent of MWFA 246 to provide local data to the network device 300 when the mobile device is online. In one embodiment, when the mobile device is online, the downloaded portion of the application might be rendered inactive. In this manner, the user may be provided with full functionality using the web-hosted application. When the mobile device is offline, then the downloaded portion may be activated from data storage to be used in the MWFA.

Generalized Operation

Figure 4:
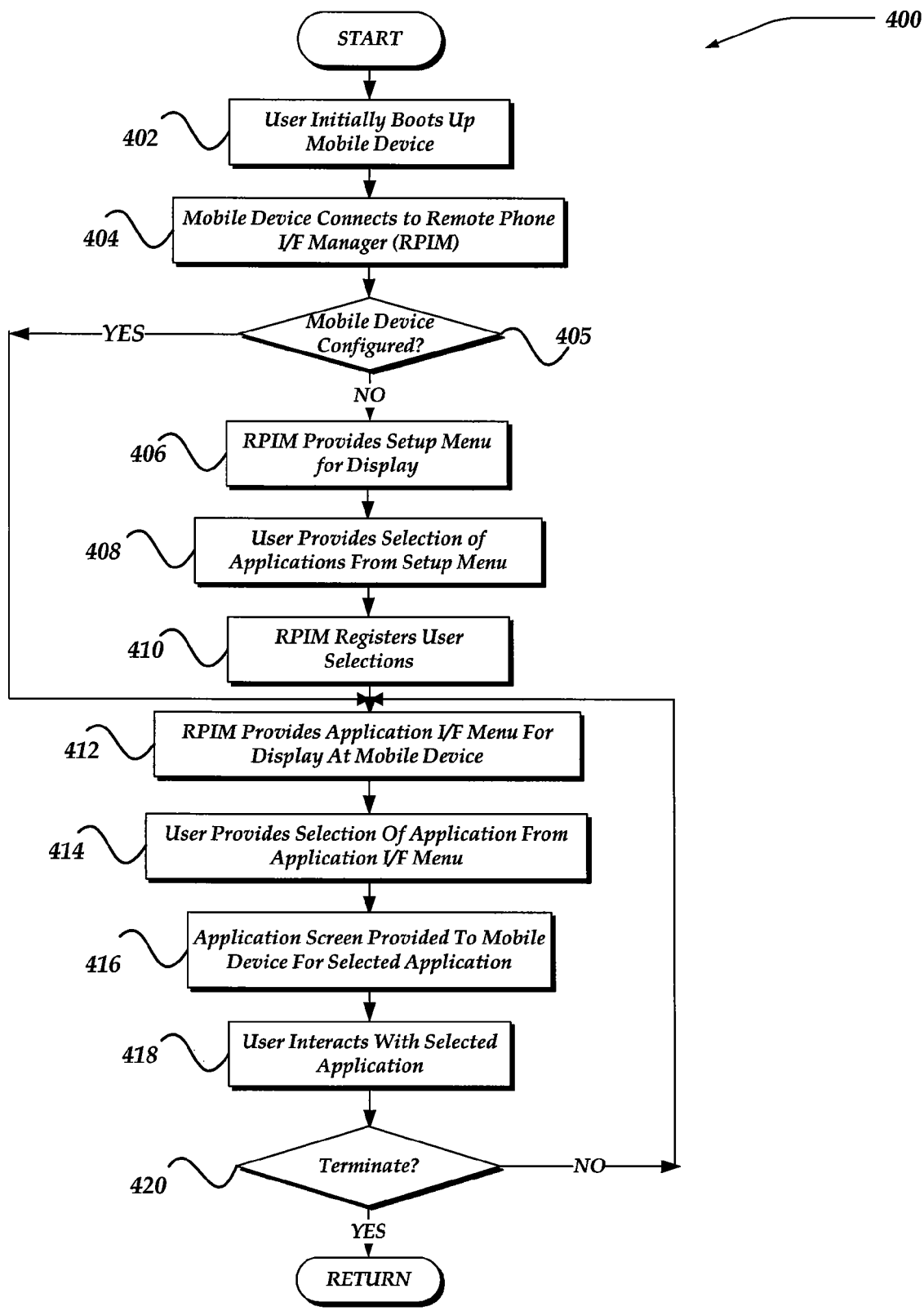
FIG. 4 illustrates a logical flow diagram generally showing one embodiment of an overview process for an initial configuration and selection of a mobile device application stack using a web-hosted framework.

The operation of certain aspects of the invention will now be described with respect to FIGS. 4-6. FIG. 4 illustrates a logical flow diagram generally showing one embodiment of an overview process for an initial configuration and selection of a mobile device application stack using a web-hosted framework. Thus, process 400 of FIG. 4 represents, for example, where a user selects to initially boot-up their mobile device, for an initial configuration. This might occur, for example, where the user initially purchases the mobile device. In one embodiment, process 400 might be performed with the user at a merchant site, or even after the user leaves the merchant site.

In any event, process 400 begins, after a start block, at block 402, where the user initially boots-up their mobile device. Booting-up the mobile device may entail powering up the mobile device, where the operating system becomes active and performs actions.

Processing then flows to block 404, where the mobile device attempts to create an active connection with a remote network device having a remote phone interface manager (RPIM). In one embodiment, the mobile device includes information as to how to contact the RPIM, including, for example, a phone number, IP address, or other network address useable to create a communication session with the RPIM. In one embodiment, the mobile device may include information about the RPIM in a SIM card, firmware, or other data store location. Thus, in one embodiment, a bootstrap program, such as MWFA, or the like, described above, may access the SIM, and retrieve the network address from the SIM of the network device for the RPIM. In one embodiment, the bootstrap program may be called by the operating system residing on the mobile device. Moreover, the bootstrap program may be installed on the mobile device at the time of purchase by the user, during a factory installation, or the like.

The MWFA, in conjunction with other components within the mobile device, establishes an active connection with the RPIM. As part of the communications to establish the connection, or as part of a handshake between the mobile device and/or the RPIM, information about the mobile device, such as a unique identifier, a network address, or the like, by be provided to the RPIM.

Processing then flows to decision block 405, where the RPIM then employs the information about the mobile device to determine whether the mobile device is currently configured or not. For example, a data store may be searched using the information about the mobile device to determine whether a configuration for a user application stack is already determined. If it is determined that the mobile device is not currently configured for use with web-hosted applications, processing flows to block 406; otherwise, processing branches to block 412.

At block 406, the RPIM provides a setup menu screen that may be sent over the established network connection to the mobile device, where it may be displayed. In one embodiment, the MWFA may employ a web browser interface to enable a display of the setup menu screen. However, the invention is not constrained to using a browser interface, and other mechanisms may be readily used to display content, such as the menu screen to the display of the mobile device. In one embodiment, the setup menu screen may provide the user with one or more interfaces from which the user may select applications and thus configure their web-hosted application stack. The invention is not constrained to any particular format, structure, or layout for displaying and/or receiving selections. However, in one embodiment, the user might be presented with a display such as screen 700A of FIG. 7.

Figure 7:
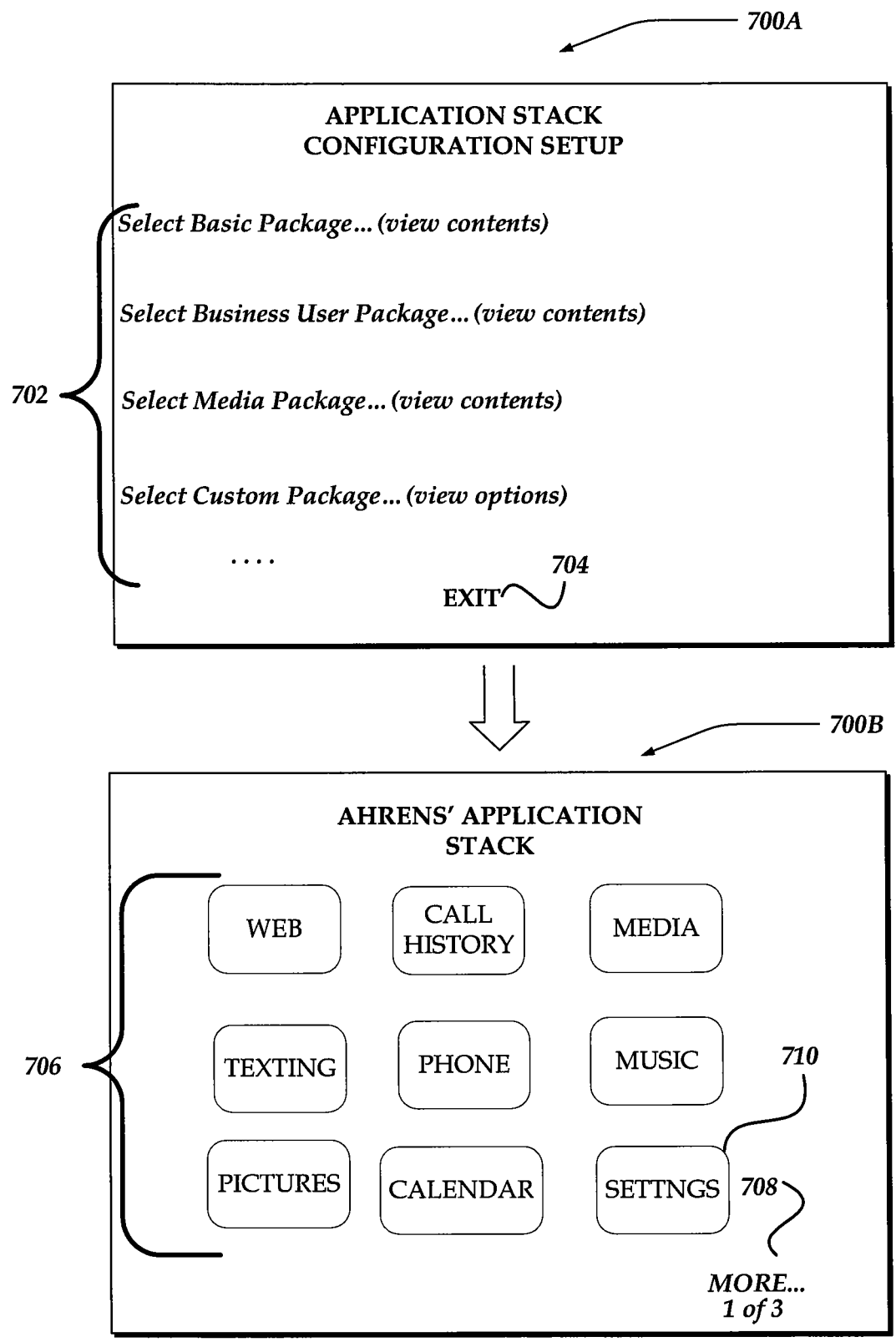
FIG. 7 illustrates non-limiting, non-exhaustive examples of screen shots of interfaces useable in managing a web-hosted application stack for mobile applications.

Referring briefly to FIG. 7, a non-limiting, non-exhaustive example of a setup menu screen 700A is illustrated. As shown, screen 700A may include many more or less components than those shown. The components shown, however, are sufficient to disclose an illustrative embodiment for practicing embodiments of the invention.

As illustrated, screen 700A shows that various packages 702 of pre-configured application stacks may be presented to the user for selection. In one embodiment, at least one of the packages 702 may include a custom package from which the user might custom select one or more applications to create their own application stack. At any point in the process, an exit selector 704 may be displayed in the setup menu screen(s) by which upon selection, the user may leave a setup screen. In one embodiment, selection of exit selector 704 may return the user to a first page of a series of setup menu screen. In another embodiment, selection might return the user to a prior selection of applications such as displayed in screen 700B of FIG. 7, or the like. In any event, one or more screens may be presented to the user to review and select the applications for their web-hosted application stack.

Returning to block 408 of process 400, then the user's selection of applications and/or configuration of applications from the provided setup menu is received. Proceeding to block 410, the user's selections are registered. Continuing next to block 412, a user interface screen, such as screen 700B of FIG. 7 may be provided for display at the user's mobile device, for use by the user. As shown in screen 700B, the user may view a plurality of icons 706 useable to select one or more different applications from their web-hosted application stack. Moreover, in one embodiment, the user's application stack might extend beyond a single screen display, each being reachable through a selector icon, such as selector 708, or the like.

Proceeding next to block 414, the user may provide a selection of an application from the displayed applications within their application stack. Upon selection of an application, processing flows to block 416, where the application may execute remotely over the network, with interface screens being displayed for the application at the user's mobile device. Moving to block 418, the user may interact with the selected application performing a variety of actions, until the user selects to terminate the selected application. Processing then moves to decision block 420, where a determination is made whether the user has selected to terminate use of their mobile device. If not, then processing loops back to block 412; otherwise, processing returns to a calling process to perform other actions.

Figure 5:
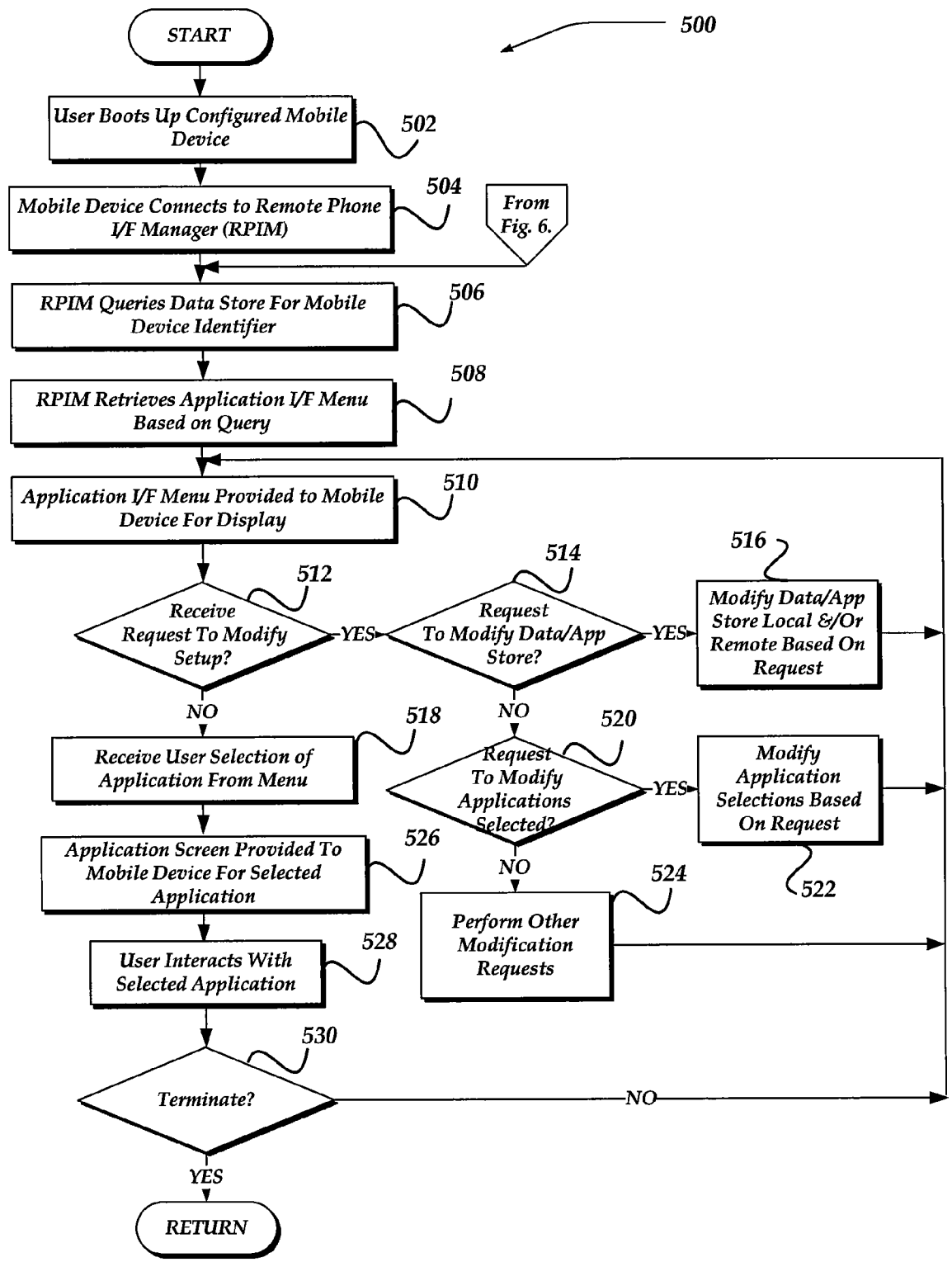
FIG. 5 illustrates a logical flow diagram generally showing one embodiment of an overview process for managing use to and/or changes to the mobile device application stack using the web-hosted framework.

FIG. 5 illustrates a logical flow diagram generally showing one embodiment of an overview process for managing use to and/or changes to the mobile device application stack using the web-hosted framework. Process 500 of FIG. 5 may be implemented substantially within RWS 107 of FIG. 1.

Process 500 begins, after a start block, at block 502, where the user turns on their mobile device, such that its operating system may boot up. Processing flows to block 504, where a network address or other unique identifier to the Remote Phone Interface Manager (RPIM) is obtained. In one embodiment, the mobile device may include information about the RPIM in a SIM card, firmware, or other data store location. Thus, in one embodiment, a bootstrap program, such as MWFA, or the like, described above, that is executed by the operating system, may access the SIM, and retrieve the network address from the SIM of the network device for the RPIM. The MWFA, in conjunction with other components within the mobile device, establishes an active connection with the RPIM. As part of the communications to establish the connection, or as part of a handshake between the mobile device and/or the RPIM, information about the mobile device, such as a unique identifier, a network address, or the like, by be provided to the RPIM.

Flowing to block 506, the RPIM may receive information about the mobile device during the communications. The RPIM may then perform a data store query to determine whether the user has configured a web-hosted application stack for the mobile device. If so, then processing continues to block 508, where an application interface menu is retrieved and provided for display by the mobile device, during block 510. If the mobile device is not registered for use with a web-based application stack, although not shown in process 500, the process may, in one embodiment, branch to process 400, block 406. It is also illustrated that block 506 of process 500 may be entered from process 600 as described in more detail below in conjunction with FIG. 6.

Processing continues from block 510, otherwise, to decision block 512, where a determination is made whether a request to modify the user's web-hosted application stack is received. In one embodiment, the user might be presented a selection icon, such as icon 710 of FIG. 7, useable to modify the user's application stack. Thus, if it is determined that the user has selected to modify their application stack, processing flows to decision block 514; otherwise, processing flows to block 518.

At block 518, a user application selection is received. Processing then flows to block 526, where the RPIM executes the requested application from the web-hosted application stack, which provides to the mobile device one or more application screens. Processing then continues to block 528, where the user may interact with the application, and/or terminate the application selected. Processing then flows to decision block 530, where a determination is made whether the user has selected to terminate the use of the web-hosted application stack. If so, processing returns to a calling process to perform other actions; otherwise, processing may loop back to block 510.

At decision block 514, however, a determination is made whether a request is received to modify how data and/or applications are stored. In one embodiment, the user may select to store an application, or portion of an application local to the mobile device. In one embodiment, the user may be provided with an option to have one or more applications to be defined within a minimum set of applications that provide at least some functionality when the mobile device is determined to be offline and unable to communicate with the RPIM and web-hosted applications. In one embodiment, availability of offline applications might be provided to the user at a different purchase level agreement, different monthly charge, or the like. In any event, if the user selects to modify how applications and/or data are accessed during offline conditions, processing flows to block 516; otherwise, processing flows to decision block 520.

At block 516, the user may specify one or more applications and/or data to be made available, at least partially, during an offline condition. In one embodiment, the user might be provided with a list of applications from their stack that may be made available. For example, while a phone application or text messaging application might not be available during offline conditions, other applications, such as a camera, calendar, calculator, or the like, might be available, at least partially. Thus, at block 516, the user may select those applications for use in a minimum set of applications from their application stack. In another embodiment, at least some data used by the applications may also be specified.

In another embodiment, however, the user might be provided with a more simplified interface. For example, rather than having the user select the applications, the user might be provided with the option of selecting to have a predefined set of applications to be made available from their application stack. In this manner, the user need only select the option to be able to work offline. However, in yet another embodiment, such option of having a minimum set of applications available to the user during an offline condition, may be automatic. As such, the user might not be provided access to block 516. In any event, should the user be allowed to select the minimum set of applications from their application stack, then block 516 provides such an option, upon completion of which processing may loop back to block 510.

At decision block 520, however, the user might be provided with an option to modify the applications to be included within their application stack accessed through the web-hosted interface. If the user selects to modify the set of applications in their application stack, processing flows to block 522; otherwise, processing flows to block 524.

At block 522, the user may be provided with a setup screen, such as screen 700A, or the like, for use in modifying their application selection. Upon selection, or if the user selects to exist without selecting, the process loops back to block 510.

Alternatively, processing flows to block 524 from decision block 520, where the user may perform other modifications, including, but not limited to various other settings, payment options, personal information, or the like. Processing then loops back to block 510.

Figure 6:
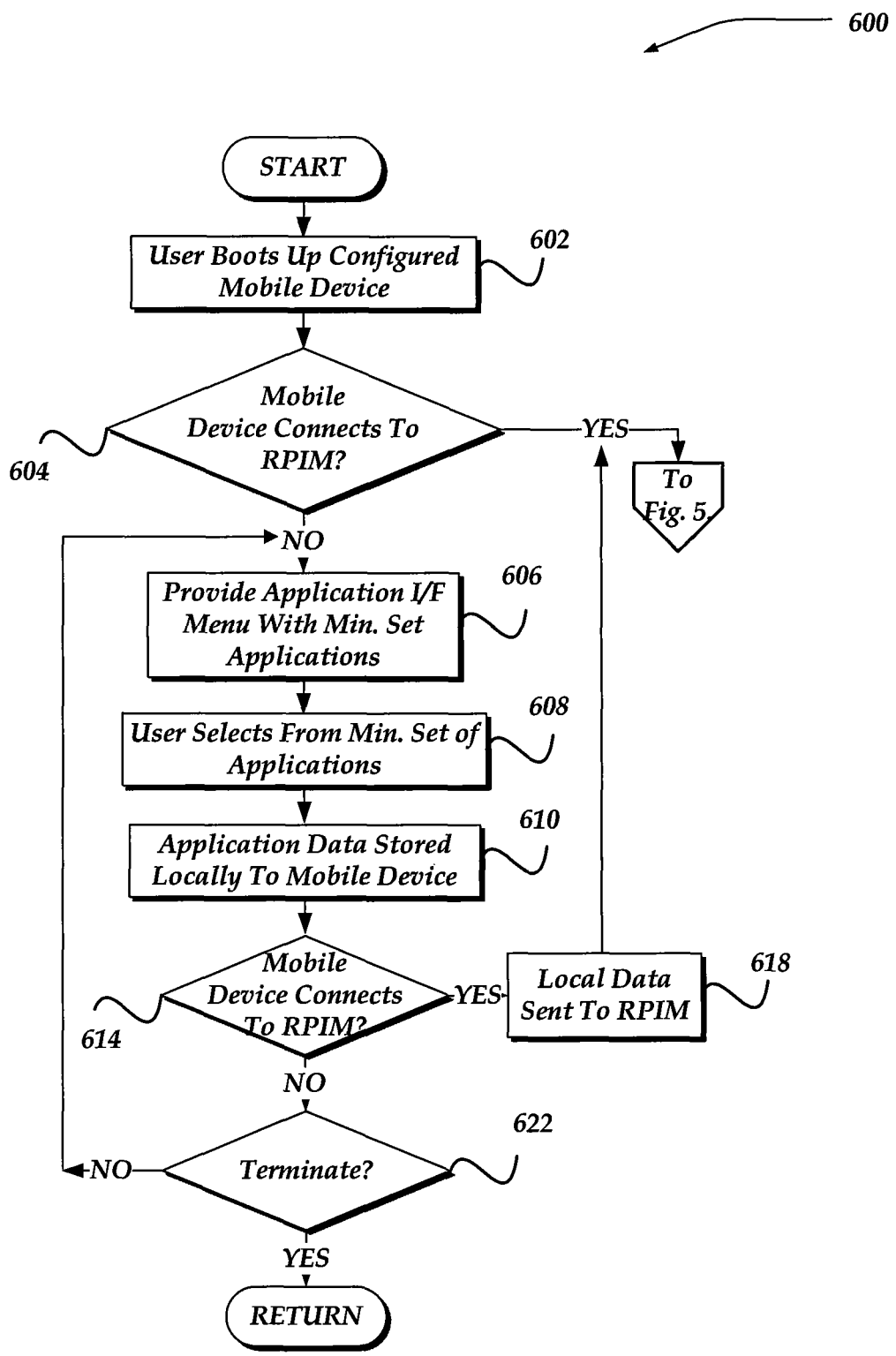
FIG. 6 illustrates a logical flow diagram generally showing one embodiment of an overview process for managing use of the mobile device application stack during a network disconnect to the web-hosted framework.

FIG. 6 illustrates a logical flow diagram generally showing one embodiment of an overview process for managing use of the mobile device application stack during a network disconnect to the web-hosted framework. Process 600 of FIG. 6 may be implemented within a mobile device.

Process 600 begins, after a start block, at block 602, where the user boots-up their mobile device. While process 600 is illustrated as starting with a boot-up, it is recognized that for any of a variety of reasons, the mobile device may have been booted-up in an online configuration, and after some time, it is determined that the mobile device is changed to an offline configuration. This may occur because, for example, a base station is too far from the mobile device, a signal strength is below a given threshold, or the like. In any event, the process flows to decision block 604, where a determination is made whether the mobile device is able to connect to the RPIM. If not, that is, the mobile device is in an offline configuration, processing flows to block 606; otherwise, processing flows to block 506 of FIG. 5.

At block 606, the interface menu for the application stack may be reconfigured to provide those applications defined as the minimum set of applications available during the offline configuration. In one embodiment, some of the selections to applications may be inhibited, for example.

Processing continues to block 608, where the user may select from the minimum set of applications during the offline configuration. Processing flows next to block 610, where at least some data may be locally stored based on actions by the user, the selected application, or the like, from block 608.

Continuing to decision block 614, a determination is made whether the mobile device is able to connect to the RPIM. Such determinations may be performed concurrent with blocks 606-610. Thus, in one embodiment, the mobile device might attempt to connect to the RPIM, while the user performs other actions on the mobile device. If the mobile device is determined to be able to connect, processing flows to block 618, where any data that may have been generated locally using MSA to the mobile device may be sent over the now active connection to the RPIM. Processing then loops back to block 506 of process 500 of FIG. 5.

If the determination, at decision block 614, is that the mobile device is unable to connect to the RPIM, the processing flows to decision block 622, where a determination is made whether the user has selected to terminate the use of the local applications. If so, processing may return to a calling process to perform other actions; otherwise, processing loops back to block 606, where the user may continue to select and/or employ one or more of the local applications.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Non-Limiting, Non-Exhaustive Examples of User Interfaces

The operation of certain aspects of the invention will now be described with respect to FIGS. 7-8. It should be noted that the illustrative screen displays in FIGS. 7-8 might include many more or less components than those shown. The components shown, however, are sufficient to disclose an illustrative embodiment for practicing various embodiments. Moreover, the screen displays are to be considered as non-limiting, and non-exhaustive, as other arrangements, applications, portions of applications, or the like, may also be used.

FIG. 7 illustrates non-limiting, non-exhaustive examples of screen shots of interfaces useable in managing a web-hosted application stack for mobile applications. As shown, screen 700A may represent one embodiment of an example configuration setup menu that provides a user with one or more packages 702 for selection. Clearly, other packages, arrangements, or the like, may also be provided to the user. In one embodiment, upon selection of a package of applications for use as a web-hosted application stack, the user may employ exit selector 704.

Screen 700B illustrates on non-limiting, non-exhaustive example of a screen 700B that may represent a user's web-hosted application stack. As such, the user might be provided various application icons 706 from which to initiate execute over the network a web-hosted application. As noted by the more selector 708, the user's web-hosted application stack may include many more (or less) applications than displayed on a single screen on the mobile device. Use of the more selector 708 may result in scrolling the application icons 706, changes to another displayed screen page, or the like. As noted, in one embodiment, the user might also be provided with setting icon 710 useable to enable the user to change one or more configuration settings, including, but not limited, to how web-hosted applications are displayed, which applications are displayed, which applications and/or data might be stored locally at least in part, or the like.

Figure 8:
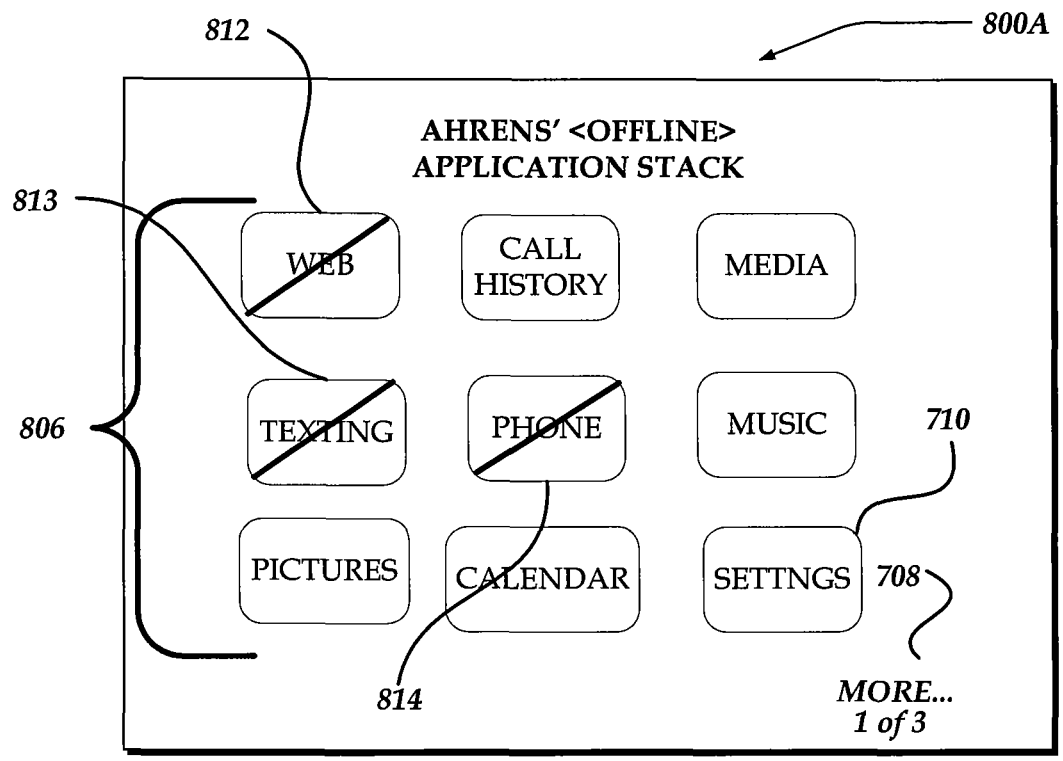
FIG. 8 illustrates non-limiting, non-exhaustive examples of screen shots of interfaces illustrating an offline line configuration useable for managing mobile applications.
Figure 8:
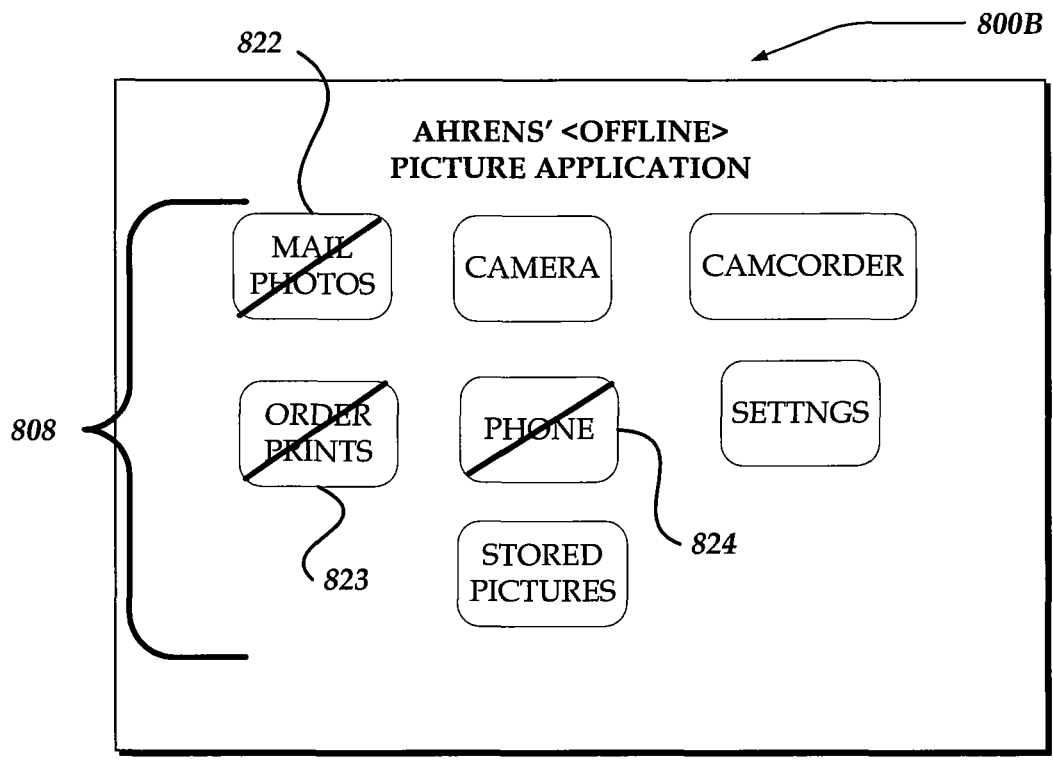

FIG. 8 illustrates non-limiting, non-exhaustive examples of screen shots of interfaces illustrating an offline line configuration useable for managing mobile applications. Screens 800A and 800B illustrate example embodiments representing possible approaches for indicating whether an application is unavailable when the mobile device determines that is in an offline configuration such that it is unable to access the web-hosted applications over the network. As shown, screen 800A may indicate that an application is unavailable by providing a strikethrough, such as seen on application icons 812-814 in application icons 806. In one embodiment, the applications illustrated as being available, at least in part, during the offline configuration, may represent one embodiment of a minimum set of applications (MSA). However, it should be noted that other applications might also be includes, including, but not limited, for example, a contact list application, a calculator, or the like.

Screen 800B illustrates that while an application may be available in an offline configuration, such as the picture application, at least some of the functions of the offline application might also be unavailable, while other functions may be available. As shown, therefore, function icons 808 includes functions 822-824 indicating that at least some functions are unavailable. It should be noted that while a strikethrough is used in FIG. 8 to indicate that an application and/or application function is unavailable, other mechanisms may also be used. For example, an application and/or application function unavailability may be indicated, but is not limited to use of a gray out mechanism, a ghosting mechanism, removing the icon from a screen display, or the like. Other mechanisms may also be used.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A network device, comprising:
a transceiver to send and receive data over a network; and
a processor configured to execute computer instructions stored on a non-transitory storage medium, the computer instructions comprising:
receiving a request from a mobile device that is configured to employ web-hosted applications;
enabling the mobile device to select at least one web-hosted application from a plurality of applications as part of a web-hosted application stack;
providing access for use by the mobile device of the selected web-hosted application, the web-hosted application configured to operate remotely on the network device rather than on the mobile device;
downloading at least a portion of the selected web-hosted application local to the mobile device, such that when the mobile device is determined to be offline from the network device, the local portion of the selected web-hosted application provides at least one function of the selected web-hosted application on the mobile device until the mobile device is determined to be online with the network device, the selected web-hosted application then resuming functionality on the network device, and, when the mobile device is determined to be offline from the network device, functions other than the at least one function are illustrated as being inaccessible on the local portion of the web hosted application; and
when the mobile device is online to the network device, the downloaded selected web-hosted application functionality local to the mobile device is rendered inactive, such that full functionality of the selected web-hosted application is provided to the mobile device using the selected web-hosted application on the network device.

2. The network device of claim 1, wherein when the mobile device is determined to be offline, at least some data is stored local to the mobile device, and when the mobile device is determined to be online, the stored local data is sent to the network device over the network.

3. The network device of claim 1, wherein the plurality of applications includes at least a calendar application, a contact list application, or a multimedia application.

4. The network device of claim 1, wherein the mobile device is configured such that the when the mobile device is turned-on, a network address to the network device is obtained from a SIM card, such that the mobile device can automatically establish a network connection with the network device for access to at least one web-hosted application.

5. The network device of claim 1, wherein the network device is further configured to update a configuration of at least one web-hosted application.

6. A system comprising:
a network device that is configured to provide access to a plurality of web-hosted applications over a network, the network device configured to communicate with a mobile device, the mobile device configured with an operating system and a web framework application, the web framework application being configured to perform computer instructions comprising:
establishing a network connection with the network device;
receiving an interface over the network connection from the network device for display on the mobile device, the interface providing access to one or more of the plurality of web-hosted applications;
enabling a user to access at least one of the plurality of web-hosted applications for execution on the network device;
downloading local to the mobile device at least a portion of at least one web-hosted application as a local portion of the web-hosted application;
when it is determined that the mobile device is offline from the network device, enabling the downloaded local portion of the web-hosted application to provide at least one function of the at least one web-hosted application on the mobile device, and, when the mobile device is determined to be offline from the network device, functions other than the at least one function are illustrated as being inaccessible on the local portion of the web hosted application; and
when it is determined that the mobile device is transitioned to online with the network device, using the at least one web-hosted application on the network device instead of the downloaded local portion of the web-hosted application; and
when the mobile device is online to the network device, the downloaded local portion of the web-hosted application functionality is rendered inactive, such that full functionality of the at least one web-hosted application is provided to the mobile device using the at least one web-hosted application on the network device.

7. The system of claim 6, wherein when it is determined that the mobile device is transitioned to online further providing any data stored local to the mobile device for the downloaded application to be sent over the network to the network device web-hosted application.

8. The system of claim 6, wherein the network device provides another interface to the user of the mobile device that enables the user to select a configuration of applications from the plurality of web-hosted applications.

9. The system of claim 6, wherein the mobile device is configured to automatically attempt to establish the network connection with the network device during a bootstrap sequence on the mobile device.

10. The system of claim 6, wherein the at least one other function of the network device web-hosted application is inaccessible through the local portion of the web-hosted application.

11. A non-transitory computer-readable storage medium having computer-executable instructions, the computer-executable instructions when installed onto a mobile device enable the mobile device to perform actions, comprising:
establishing a network connection with a network device;
receiving an interface over the network connection from the network device for display on the mobile device, the interface providing access to a plurality of web-hosted applications;
enabling a user to access at least one of the plurality of web-hosted applications for execution on the network device;
downloading local to the mobile device at least a portion of at least one web-hosted application as a local portion of the web-hosted application;
when it is determined that the mobile device is offline from the network device, enabling the downloaded local portion of the web-hosted application to provide at least one function of the at least one web-hosted application on the mobile device, and, when the mobile device is determined to be offline from the network device, functions other than the at least one function are illustrated as being inaccessible on the local portion of the web hosted application; and when it is determined that the mobile device is transitioned to online with the network device, using the at least one web-hosted application instead of the downloaded local portion of the web-hosted application; and when the mobile device is online to the network device, the downloaded local web-hosted application functionality local to the mobile device is rendered inactive, such that full functionality of the at least one web-hosted application is provided to the mobile device using the at least one web-hosted application on the network device.

12. The non-transitory computer-readable storage medium of claim 11, wherein downloading of at least the portion is performed in a background mode, such that the user is enabled to execute at least another web-hosted application on the network device.

13. The non-transitory computer-readable storage medium of claim 11, wherein when it is determined that the mobile device is transitioned to online further providing any data stored local to the mobile device for the downloaded application to be sent over the network to the network device web-hosted application.

14. The non-transitory computer-readable storage medium of claim 11, wherein the network device provides another interface to the user of the mobile device that enables the user to select a configuration of applications from the plurality of web-hosted applications.

15. The non-transitory computer-readable storage medium of claim 11, wherein the mobile device is configured to automatically attempt to establish the network connection with the network device during a bootstrap sequence on the mobile device.

16. A method that modifies a mobile client device such that the mobile client device is enabled to manage actions, comprising:

establishing a network connection with a network device;

receiving an interface over the network connection from the network device for display on the mobile device, the interface providing access to a plurality of web-hosted applications on the network device;

enabling a user to access at least one of the plurality of web-hosted applications for execution on the network device;

downloading local to the mobile device at least a portion of at least one web-hosted application as a local portion of the web-hosted application;

when it is determined that the mobile device is offline from the network device, enabling the downloaded local portion of the web-hosted application to provide at least one function of the at least one web-hosted application on the mobile device, and, when the mobile device is determined to be offline from the network device, functions other than the at least one function are illustrated as being inaccessible on the local portion of the web hosted application; and when it is determined that the mobile device is transitioned to online with the network device, using the at least one web-hosted application on the network device instead of the downloaded local portion of the web-hosted application; and when the mobile device is online to the network device, the downloaded local portion of the web-hosted application functionality is rendered inactive, such that full functionality of the at least one web-hosted application is provided to the mobile device using the at least one web-hosted application on the network device.

17. The method of claim 16, wherein when it is determined that the mobile device is transitioned to online further providing any data stored local to the mobile device for the downloaded application to be sent over the network to the network device web-hosted application.

18. The method of claim 16, wherein the mobile device is configured to automatically attempt to establish the network connection with the network device during a boot strap sequence on the mobile device.

* * * * *